US006714840B2

(12) United States Patent
Sakaue et al.

(10) Patent No.: US 6,714,840 B2
(45) Date of Patent: Mar. 30, 2004

(54) USER-MACHINE INTERFACE SYSTEM FOR ENHANCED INTERACTION

(75) Inventors: Masaya Sakaue, Iwata (JP); Tsuyoshi Kamiya, Iwata (JP); Makoto Yoshida, Iwata (JP); Nobuyasu Arimune, Iwata (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 10/076,861

(22) Filed: Feb. 12, 2002

(65) Prior Publication Data

US 2002/0165642 A1 Nov. 7, 2002

Related U.S. Application Data

(62) Division of application No. 09/630,577, filed on Aug. 3, 2000, now Pat. No. 6,347,261.

(30) Foreign Application Priority Data

Aug. 4, 1999 (JP) .......................... 11-221237
Aug. 4, 1999 (JP) .......................... 11-221238
Aug. 4, 1999 (JP) .......................... 11-221239

(51) Int. Cl.$^7$ .............................. G05B 19/00
(52) U.S. Cl. ............... 700/245; 700/257; 700/258; 700/260; 700/264; 701/23; 701/29; 318/568.1
(58) Field of Search ................ 700/245, 257, 700/260, 258, 264, 17, 11, 56, 86; 382/118, 209; 701/23, 29; 318/568.1

(56) References Cited

U.S. PATENT DOCUMENTS 5,283,841 A 2/1994 Yamada ................ 382/162
5,727,950 A 3/1998 Cook et al. ............ 434/350
5,966,691 A 10/1999 Kibre et al. ........... 704/260

(List continued on next page.)

OTHER PUBLICATIONS

Breazeal et al., Infant–like social interactions between a robot and a human caregiver, 1998, Internet, p. 1–p. 44.*
Hara et al., Real–time facial interaction between human and 3D face robot, 1996, IEEE, pp. 401–409.*
Maxwell et al., Alfred: The robot waiter who remembers you, 1999, Internet, pp. 1–12.*

(List continued on next page.)

*Primary Examiner*—William A Cuchlinski, Jr.
*Assistant Examiner*—McDieunel Marc
(74) *Attorney, Agent, or Firm*—Knobbe, Martens, Olson & Bear, LLP

(57) ABSTRACT

A user information input structure that inputs user information, a memory structure that stores user's bearing information as robot's bearing pattern, and a regenerating structure that regenerates the pattern based on the information input to the user information input structure. A behavior selection and determination structure for selecting and deciding behaviors based on user information, a user information recognition structure for recognizing a user, a memory structure for storing the recognized user information, a calculating structure for comparing the recognized user information with the stored user information to calculate user recognition, and a compensating structure for compensating a selection and determination method in the behavior selection and determination structure in accordance with the calculated user recognition. An actuator for driving a robot, a detection structure for detecting user information and environment information, a feelings generation structure for generating artificial feelings for a robot based on the detecting user and environment information, and a behavior determination structure for determining behaviors by the robot based on the generated artificial feelings, wherein the behavior determination structure controls the actuator so that a resistance acted on the robot may be changed on tactile information the user has applied to the robot.

13 Claims, 14 Drawing Sheets

U.S. PATENT DOCUMENTS

| | | | |
|---|---|---|---|
| 6,020,876 A | 2/2000 | Rosenberg et al. | 345/157 |
| 6,166,723 A | 12/2000 | Schena et al. | 345/184 |
| 6,201,948 B1 | 3/2001 | Cook et al. | 434/350 |
| 6,347,261 B1 * | 2/2002 | Sakaue et al. | 700/245 |

OTHER PUBLICATIONS

Hirashi HP, Face robot, no date, pp. 1–2.*

Kobayashi et al., The recognition of basic facial expressions by neural network, 1991, IEEE, pp. 460–466.*

Kimura et al., Estimation of the degree of human facial expression, 1996, IEEE, pp. 347–351.*

Otsuka et al., Recognition of facial expressions using HMM with continous output probabilities, 1996, IEEE, pp. 323–328.*

Agapakis, John E., et al., "Programming & Control of Multiple Robotic Devices in Coordinated Motion," IEEE, 1990, pp. 362–367.

Alda, Integrated Vision, Speech & Action, 1995, Internet, pp. 1–2.*

Guzzoni et al., Robots in a distributed agent system, 1998, Internet, pp. 1–9.*

Kurt Konolige, "Autonomous Vehicle Control," 1995, www.ai.sri.com/people/flakey/control.html.

* cited by examiner

Extraction of positions for user's body and arms
Record of right (R) and left (L) arm positions with respect to time (t)
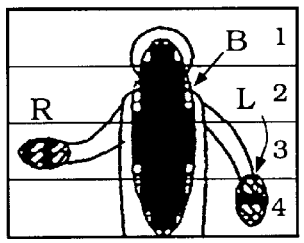 
| t | 0 | 1 | 2 | 3 | ••• |
|---|---|---|---|---|-----|
| L | 4 | 4 | 3 | 4 | ••• |
| R | 4 | 3 | 2 | 3 | ••• |
*Figure 5*
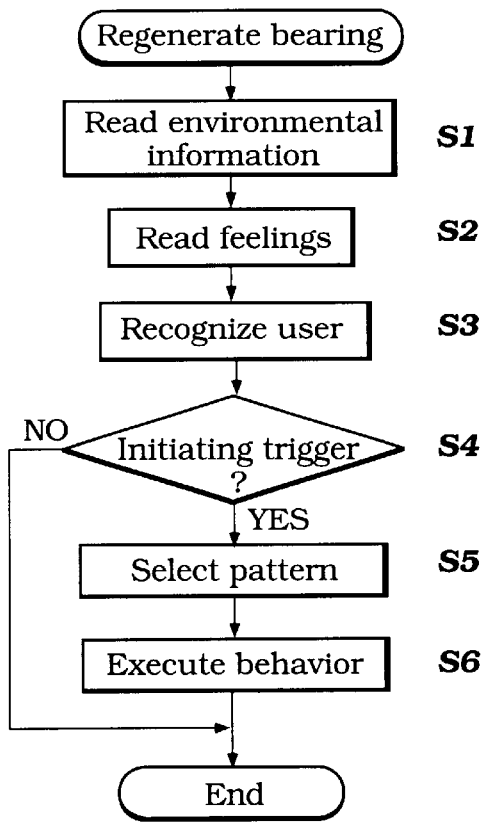
*Figure 6*

Extraction of positions for user's body and arms

Record of right (R) and left (L) arm positions with respect to time (t)

| t | 0 | 1 | 2 | 3 | ••• |
|---|---|---|---|---|---|
| L | 4 | 4 | 3 | 4 | ••• |
| R | 4 | 3 | 2 | 3 | ••• |

Examples of compensated feelings generation parameters

| Tameability | | Compensated contents |
|---|---|---|
| (Low) | 0 | Standard |
| | 1 | Increase joy coefficient + 5% |
| | 2 | Increase joy coefficient + 5% <br> Decrease fear coefficient - 5% |
| (High) | 3 | Increase joy coefficient + 10% <br> Decrease fear coefficient - 5% <br> Decrease sorrow coefficient - 5% |
| | ⋮ | ⋮ |

*Figure 14*

Examples of compensated behavior determination

| Tameability | | Compensated contents |
|---|---|---|
| (Low) | 0 | Standard |
| | 1 | Preferentially select attention object |
| | 2 | In addition to 1. preferentially select behaviors approaching user |
| (High) | 3 | In addition to 1 and 2. magnify behaviors selected from joy <br><br> Examples: speed, stride |
| | ⋮ | ⋮ |

*Figure 15*

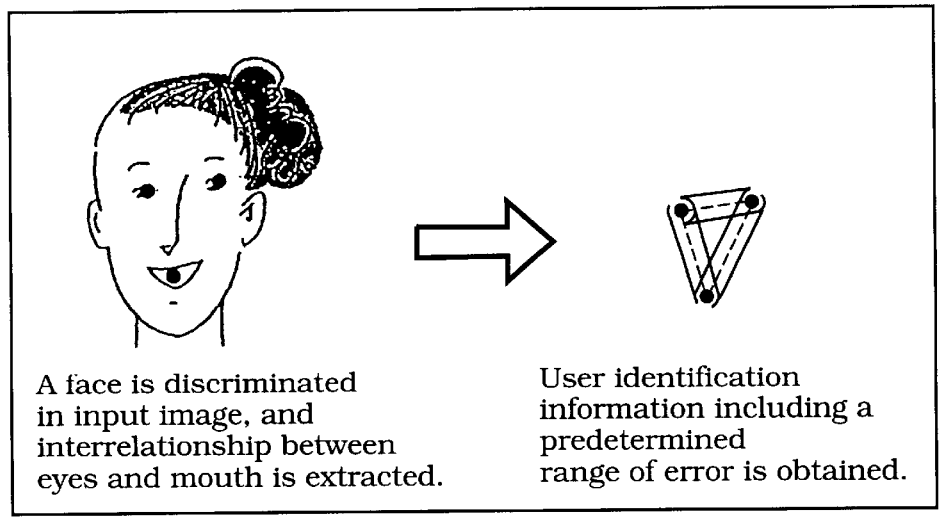
Figure 16(A)
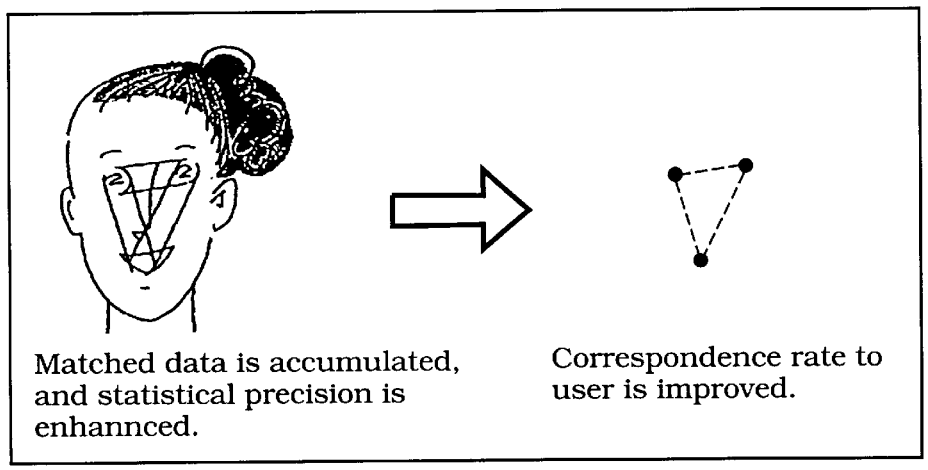
Figure 16(B)

USER-MACHINE INTERFACE SYSTEM FOR ENHANCED INTERACTION

This application is a division of application Ser. No. 09/630,577, filed Aug. 3, 2000, now U.S. Pat. No. 6,347,261.

BACKGROUND OF THE INVENTION

1. Field of the Invention

The invention relates to an autonomous behavior expression system in a robot for toys, games, civil lives and industries and a speech interactive system; and to a user recognition growth system applicable to a robot for toys, games, civil lives and industries and various types of interactive machinery for navigation tools, vending machines, and automatic receiving apparatuses.

2. Description of the Related Art

These days, a pet type of robot, which, through learning process, becomes tame to a user and can express his feelings with characteristic movements to communicate with the user, has been commercialized. For example, Japanese Patent Publication No. Hei 11-58,274 discloses a robot that can learn predetermined postures and motions.

However, according to the prior art, users have to intentionally teach a robot some behaviors to learn through the training of teaching play back, which lacks natural interaction. Accordingly, because a pet type of robot whose primary object is to interact is not appealing, users soon lose interest in the robot. There can be provided a system where the movements of a user are recognized and stored as a gesture to be expressed as autonomous behaviors by a robot, through which interaction between a robot and a user is produced. The system detects the position and posture of the user by image processing and extracts the position of, for example, both his hands. Doing this, considering lightness and environment, requires large calculation load, which cheap microprocessors cannot execute.

In addition, Japanese Patent Publication No. Hei 11-58,274 discloses a robot that, through learning, can change his character or tendency, depending on his user's attitudes which train the robot to be inclined to bark when the robot barks and the user praises the barking and to be inclined to obedient when, on the contrary, the user becomes angry.

Robots in the prior art, however, do no have the ability to recognize user's face and voice. In the field of security technology, it is known that users can be identified from various kinds of information. Even if the security technology is applied to robots, it is only supposed to know whether or not a person in question is a lawful user, which does not generate interest on the part of the user, because robots are expected to bring about interaction with the user.

Moreover, robots in the prior art only express artificial feelings by their actions through visual and auditory sense toward users. When a user touches the robot or holds its hand, the robot does not directly respond to the touched or held portions. Since the robot is not as interactive as it should be expected to be, there is a possibility that the user loses interest in the robot.

To enhance intimacy between machinery and a user, there are proposed a machine operation system in which a personalized artificial agent appears on a screen and talks to a user, and a system in which a robot can communicate with a user. The systems generate artificial feelings and change characters and behaviors, depending on user's operation and attitude, to express the results. However, in reality, expressions on the screen, synthesized voices, or behavioral patterns are only changed. This is not sufficient for good communication from the user's point of view, which produces the possibility that the user loses interest in the robot.

SUMMARY OF THE INVENTION

The invention solves the first problem in the prior art. One object of one embodiment in accordance with the invention is to provide an autonomous behavior expression system where intimacy between a user and a robot can be enhanced and the robot can become attractive to the user, and to provide a speech interactive system where an interactive conversation or deed with a user can be made.

One aspect of the invention comprises a user information input structure that inputs user information, a memory structure that stores user's bearing information as robot's bearing pattern, and a regenerating structure that regenerates the pattern based on the information input to the user information input structure.

When a user plays with a robot by moving robot's hand upward and downward, the user's movements are stored. Since the robot expresses the stored movements as his autonomous behaviors, interaction with the user can be produced. When the user wears or holds a specific thing, it can be detected as a hand or foot, which can easily recognize and store the user's movements.

Information such as the bearing and voice of the user and the operation by the user is stored in the system. Triggered by the time when the user makes specific instructions or when the internal state of the system comes to a predetermined state, behaviors based on the stored information such as the bearing are expressed.

The invention solves the second problem. One object of another embodiment of the invention is to provide a user recognition growth system where a robot gradually improves its recognition toward the user and, as a result, the behaviors of the robot gradually change.

Another aspect of the invention comprises a behavior selection and determination structure for selecting and determining behaviors based on user information, a user information recognition structure for recognizing a user, a memory structure for storing recognized user information, a calculation structure for comparing the recognized user information with stored user information to calculate user recognition, and a compensation structure for compensating a selection and determination method of the behavior selection and determination structure according to the calculated user recognition.

Characteristic information about a new user recognized is stored in the system. The information obtained when the user is seen and the stored information are compared for correspondence. Depending on the degree of the correspondence, a method of selecting actions to take and the actions selected are compensated, and at the same time, new information about the user is obtained, by which recognition of the user is gradually improved to give the user an impression that the robot gets tamed to the user.

The invention solves the third problem in the prior art. One object of still another embodiment of the invention is to provide a tactile expression system in a robot which can realize tactile interaction between the user and the robot.

Still another aspect of the invention comprises an actuator for driving a robot, a detection structure for detecting user information and environment information, and a feelings generation structure for generating artificial feelings for a robot based on the detecting user and environment information, a behavior determination structure for determining behaviors by the robot based on the generated artificial feelings, wherein the behavior determination structure controls the actuator so that a resistance acted on the robot may be changed on tactile information the user has applied to the robot.

In response to tactile information the user gave to the system when the user touched or held, external state (for example, environment information) and internal state of the system (for example, artificial feelings), the actuator is controlled so that the resistance when the user has touched and operated the system may be changed.

For purposes of summarizing the invention and the advantages achieved over the prior art, certain objects and advantages of the invention have been described above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention.

FIG. 5 illustrates the process in FIG. 4.

FIG. 6 is a flowchart showing a first embodiment of the process of regenerating bearing stored in FIG. 4.

FIG. 14 illustrates compensation of feelings generation parameters of FIG. 12.

FIG. 15 illustrates compensation of behavior determination of FIG. 12.

FIG. 16 illustrates recognition of a user's face.

DETAILED DESCRIPTION OF THE PREFERRED EMBODIMENT

The embodiments in accordance with the invention will be explained below based on the figures. A robot in the invention, in addition to a machine robot, includes an electronic robot displayed on a computer.

Figure 1:
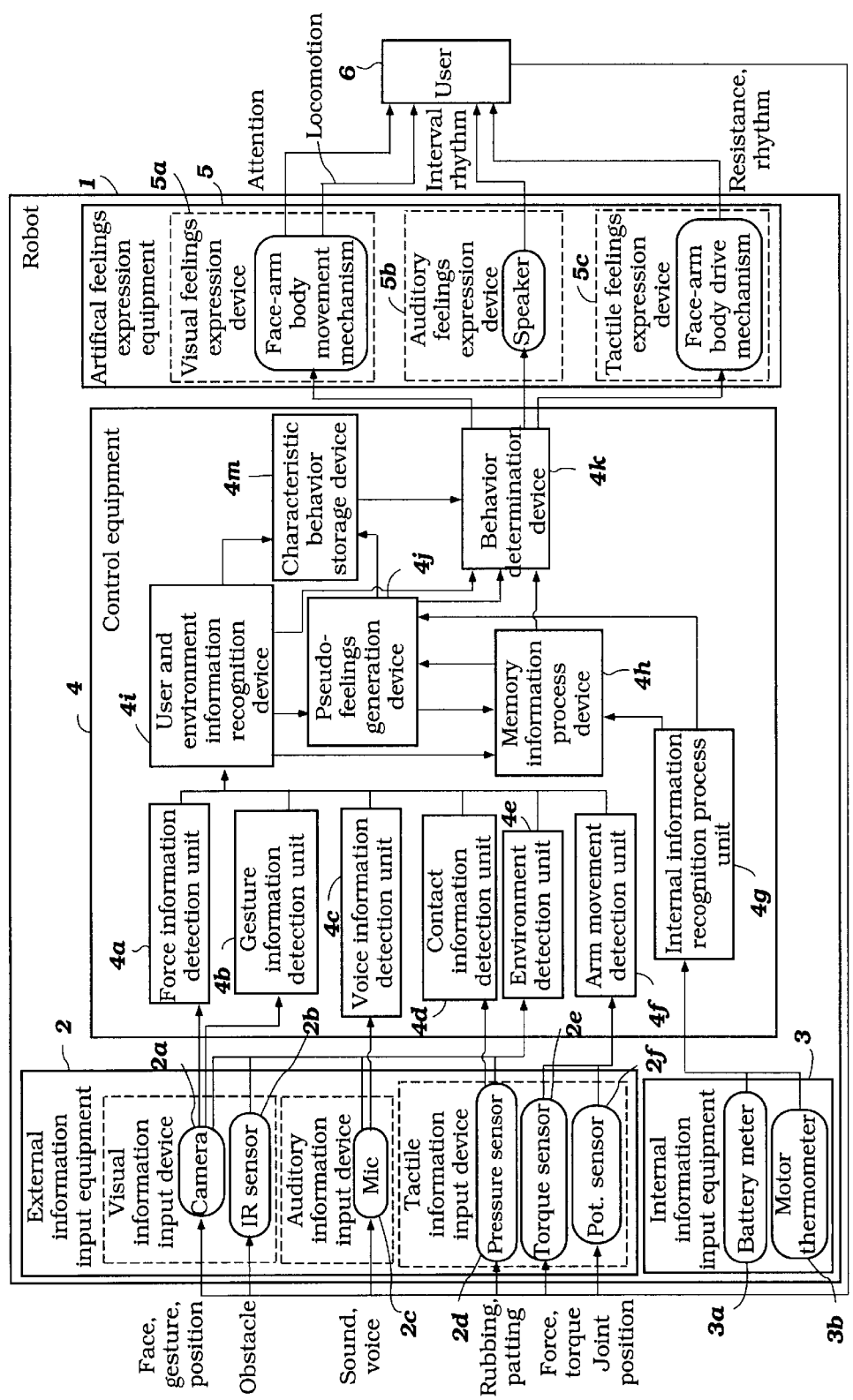
FIG. 1 is an entire block diagram illustrating one embodiment of an autonomous behavior expression system and a speech interactive system, a user recognition growth system, and a tactile expression system in accordance with the invention.

FIG. 1 is an entire block diagram illustrating one embodiment of an autonomous behavior expression system in a robot in accordance with the invention. A robot 1 comprises an external information input equipment 2, an internal information input equipment 3, a control equipment 4, and an artificial feelings expression equipment 5. The external information input equipment 2 receives various types of information related to a user 6. The control equipment 4 determines behaviors of the robot based on the internal and external information obtained. The feelings and behaviors of the robot are transferred to the user 6 by the artificial feelings expression equipment 5.

The external information input equipment 2 comprises, as a visual information input device, a camera 2 which detects user's face, gesture, position, and an infrared (IR) sensor 2b which detects surrounding obstacles. The external equipment 2 comprises, as a auditory information input device, a mic 2c which detects user's voice, and in addition to this, as a tactile information input device, a pressure sensor 2d which detects user's rubbing and patting, a torque sensor 2e which detects legs' and/or hands' forces and torque of the robot, and a potentiometer sensor 2f which detects legs' and/or hands' joint positions of the robot. The internal equipment 3 comprises a battery meter 3a which detects information about robot's hunger, and a motor thermometer 3b which detects information about robot's fatigue.

The control equipment 4 comprises a face information detection unit 4a which detects information about user's face, a gesture information detection unit 4b, a voice information detection unit 4c which detects user's voice by a signal from the mic 2c, a contact information detection unit 4d which detects contact information with the user by a signal from the pressure sensor 2d, an environment detection unit 4e which detects environment by signals from the camera 2a, the IR sensor 2b, the mic 2c and the pressure sensor 2d, and an arm movement detection unit 4f which detects posture, movement and resistance of robot's arm are fed to a user and environment information recognition device 4i. The outputs from the battery meter 3a and the motor thermometer 3b are supplied to an internal information recognition process unit 4g, where internal information of the robot can be recognized.

Figure 2:
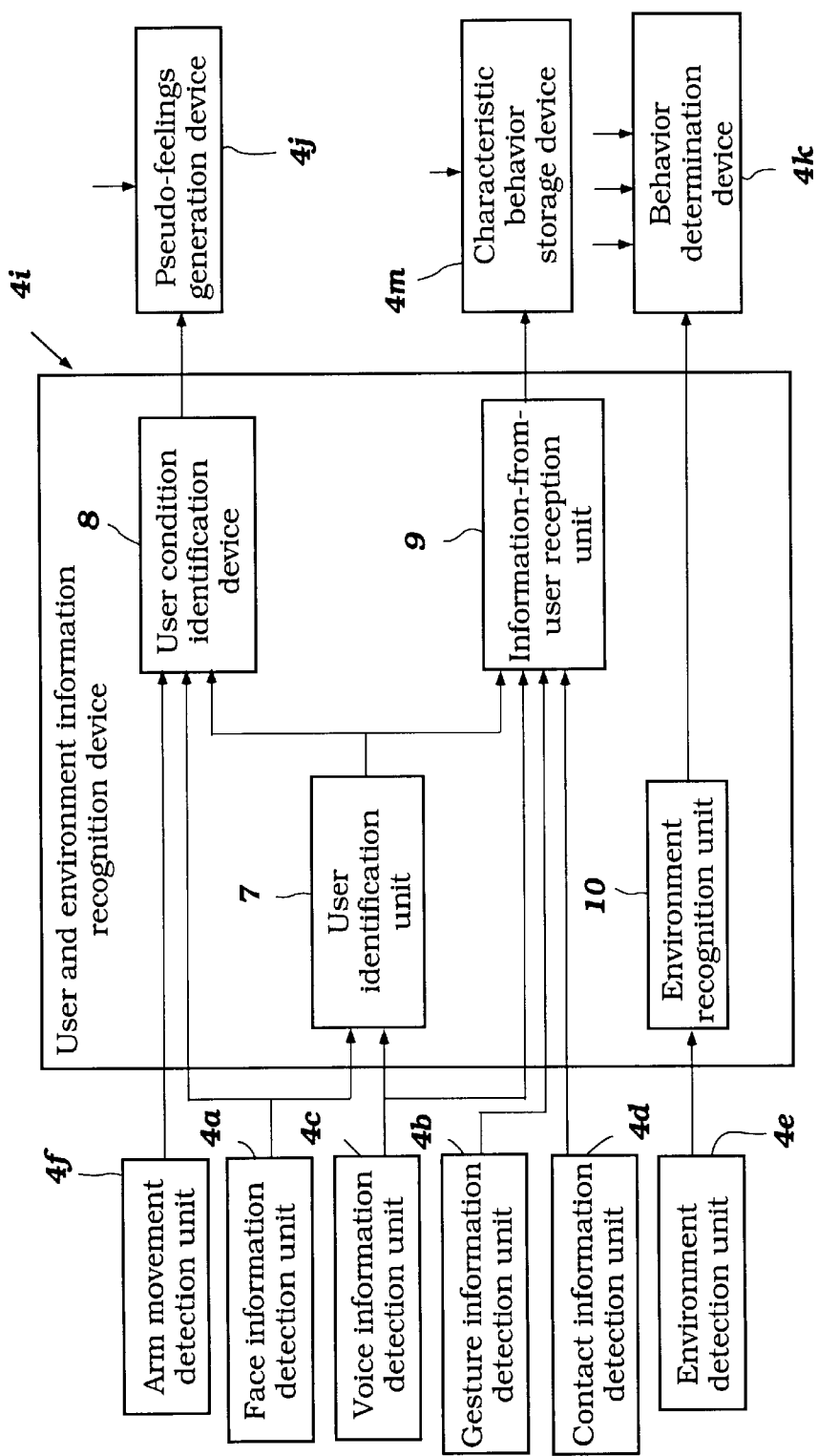
FIG. 2 is a block diagram illustrating a control system for a user and environment information recognition device in FIG. 1.

FIG. 2 is a block diagram illustrating a control system for a user and environment information recognition device 4i in FIG. 1. In the user and environment information recognition device 4*i*, the signals from the face information detection unit 4*a* and the voice information detection unit 4*c* are supplied to a user identification unit 7 where the user may be identified. Based on the information detected at the arm movement detection unit 4*f*, the face information detection unit 4*a* and the user identification unit 7, user condition can be identified at a user condition identification unit 8, which is conveyed to a pseudo-feelings generation device 4*j*. The information detected at the voice information detection unit 4*c*, the gesture information detection unit 4*b*, the contact information detection unit 4*d*, and the user identification unit 7 is applied to an information-from-user reception unit 9, whose output is provided to a characteristic behavior storage device 4*m*. Information detected at the environment detection unit 4*e* is applied to an environment recognition unit 10, which in turn supplies the information to a behavior determination device 4*k*.

Information from the user condition identification unit 8 in the user and environment information recognition device 4*i* is sent to the pseudo-feelings generation device 4*j*, where robot's pseudo-feelings (artificial feelings) are produced based on feelings model stored in a memory information process device 4*h*. The feelings model is a calculation formula for seeking parameters to express robot's feelings such as anger, sorrow, joy, fear, dislike, fatigue, hunger, and sleepiness. The robot's feelings are generated in accordance with user information (user's temper, instruction, etc.) and environment information (lightness of a room, sound, etc.). When a user comes home, for example, his robot expresses "joy"; when unfamiliar people come in, the robot expresses "anger." User's scolding or praising the robot changes robot's feelings to grow the robot. The feelings model may be made so that when the robot is a baby, he makes a immature response, and as he grows older, he behaves maturely. The character and behavior as the robot has acquired with his growth are stored in the memory information process device 4*h* to perform learning process.

Both outputs from the user and environment information recognition device 4*i* and the pseudo-feelings generation device 4*j* are applied to the characteristic behavior storage device 4*m*, where the characteristic behaviors-behavior the robot gradually becomes tame to his/her master (user), and the robot learns his/her master's gesture or bearing—are stored and processed. The output from each of the user and environment information recognition device 4*i*, the pseudo-feelings generation device 4*j* and the characteristic behavior storage device 4*m* is supplied to the behavior determination device 4*k*.

Figure 3:
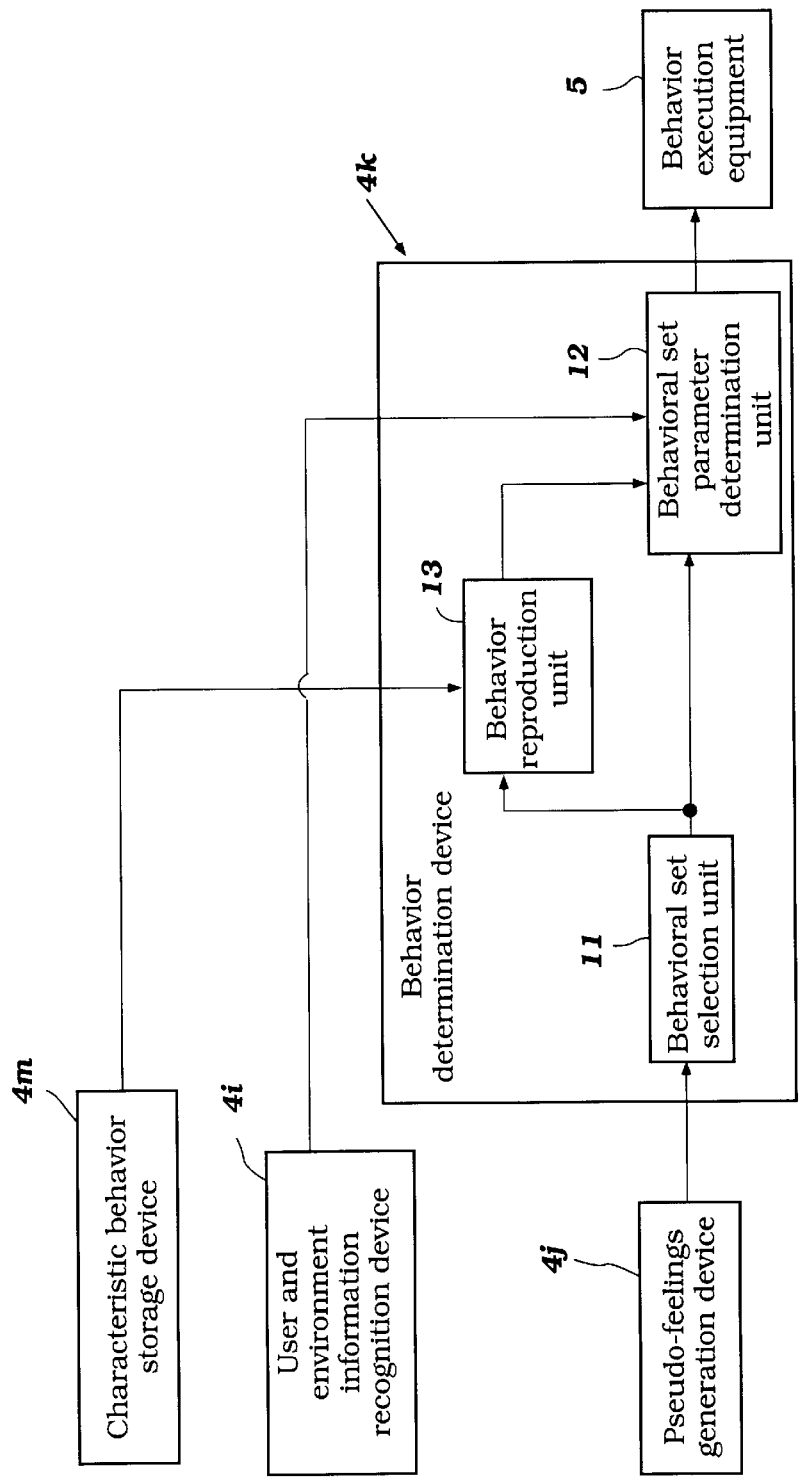
FIG. 3 is a block diagram illustrating a control system for a behavior determination device in FIG. 1.

FIG. 3 is a block diagram illustrating a control system for a behavior determination device 4*k* in FIG. 1. The output of the pseudo-feelings generation device 4*j* is given to a behavioral set selection unit 11, where basic behaviors for the robot are determined, referring to behavior set (behavior library) stored in the memory information process device 4*h*. The output from the behavioral set selection unit 11 is supplied to a behavioral set parameter determination unit 12. The behavior library is movement sequence for the robot to make specific expressions, and represents the following examples. When a behavioral pattern is to "go forward," it means a sequence that "each leg is moved first in a predetermined order." When a behavioral pattern is to "dance," that indicates a sequence that "a fore leg is lifted upward and lowered downward by turns, with a hind leg folded to be in a sitting position." Moreover, basic patterns such as moving a hand upward, downward or forward are stored. The contents of the behavior set stored in the characteristic behavior storage device 4*m* are sent to a behavior reproduction unit 13, where the behavioral set for the behavioral set selection unit 11 is compensated, and then are sent to the behavioral set parameter determination unit 12. Set in the behavioral set parameter determination unit 12 are the speed at which the robot approaches to the user and the resistance by which the robot holds the user's hand, which are transferred to the behavior execution equipment 5.

The artificial feelings expression equipment comprises a visual feelings expression device 5*a*, an auditory feelings expression device 5*b*, and a tactile feelings expression device 5*c*.

Information determined at the behavior determination device 4*k* is applied to the artificial feelings expression equipment (behavior execution equipment) 5. In the a visual feelings expression device 5*a*, a movement mechanism for the face, arms, or body of the robot is driven, which produces attention and locomotion information (for example, facial expression, neck shaking, or dancing) to be applied to the user 6. In the auditory feelings expression device 5*b*, a speaker is driven, which generates interval and rhythm information (for example, bowwow) to be supplied to the user 6. In the tactile feelings expression device 5*c*, the movement mechanism for the face, arms and body of the robot is driven, which generates resistance or rhythm information (for example, the tactile sense the user feels when he receives the robot's hand raised on his/her hand) to be transferred to the user 6. The movement mechanism for the face, arms and body of the robot for includes an actuator such as a motor, an electromagnetic solenoid, or an air or oil cylinder.

One feature of one embodiment in accordance with the invention is that based on the user and environment information recognition device 4*i* and the pseudo-feelings generation device 4*j*, constituted in the characteristic behavior storage device 4*m* are characteristic behaviors, which in turn is transferred to the behavior determination device 4*k* to cause the robot to act characteristic behaviors. This will be described in FIGS. 4–7.

FIGS. 4–7 describe one embodiment of an autonomous behavior expression system in a robot in accordance with the invention. The autonomous behavior by a robot is explained as "bearing" herein below.

Figure 4:
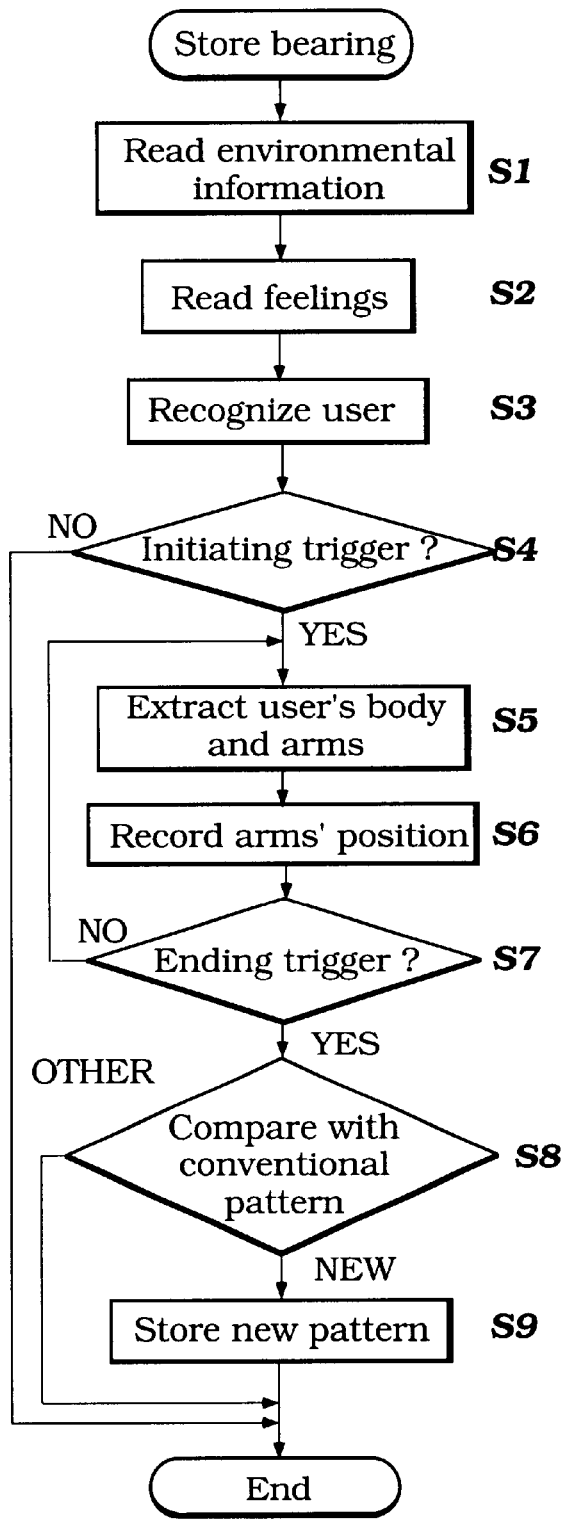
FIG. 4 is a flowchart showing one embodiment of an autonomous behavior expression system in a robot in accordance with the invention and showing a first embodiment of the process of storing bearing.

FIG. 4 is a flowchart showing a first embodiment of the process of storing bearing. In step S1, environmental information such as lightness of a room, time is read. In step S2, feelings such as anger, sorrow, joy, fear, dislike, fatigue, and sleepiness the robot expresses are read. In step S3, a user is recognized. In step S4, an decision is made as to whether or not an initiating trigger is found that executes storing bearing. The initiating trigger includes the following as examples: an action of pressing a switch by the user, an action specified by voice such as "memorize!", a situation where robot's "joy" exceeds a predetermined value and/or the user comes to the front of the robot, or a situation where the user gets happy that the robot imitates his latest movement if the user stops his movement while history of user's bearing is stored. When no initiating trigger is found, the process is terminated.

The robot may be related to the initiating trigger as follows: when the movement of the user has stopped, the robot regenerates the latest movement of the user, with all the history of the user's movement stored; and when some attitudes are beforehand registered in the robot, the robot begins to imitate the attitudes under a signal of user's specific voice or gesture. When bearing is stored associated with environmental information at that time, the bearing is regenerated if an environment close to the environmental information has arrived. The environment may be used as an initiating trigger.

FIG. 5 is a figure for illustrating the process in FIG. 4. In step S4, when an initiating trigger is found, the step proceeds to step S5, where, as shown in FIG. 5, an image of the body B and arms R, L of the user 6 is extracted. In step S6, the positions of the right arm R and left arm L are recorded with respect to time. The extracted image is horizontally divided into 1–4. Using the divisions, for example, the positions of the right arm R are recorded as 4, 3, 2, 3, . . . . Without resorting to step S5, the user may directly teach the robot bearing. The process continues till an ending trigger can be found at step S7. The ending trigger exemplifies the following: an action of pressing a switch by the user, an action specified by voice such as "finish!", a situation where a certain amount of time has elapsed from a beginning, or a situation where the user is keeping the same posture over a predetermined amount of time. When an ending trigger is found, the process proceeds to step S8, where a comparison is made between a pattern recorded lately and a pattern recorded previously. When a new pattern is found, in step S9, the new pattern is stored together with the user information S1–S3, environment information and feelings.

FIG. 6 is a flowchart showing a first embodiment of the process of regenerating bearing. In step S1, environment information such as lightness of a room, environment sound, and time is read. In step S2, feelings such as anger, sorrow, joy, fear, dislike, fatigue, and sleepiness the robot expresses are read. In step S3, the user is recognized. In step S4, an decision is made whether or not an initiating trigger is found to regenerate bearing. The initiating trigger includes an action of pressing a switch by the user, and a situation where robot's "joy" exceeds a predetermined value and/or the same user is present. When no initiating trigger is found, the process is terminated.

When step S4 finds an initiating trigger, the step proceeds to step S5, where bearing patterns are selected. In step S6, based on the sequences stored, basic behavior patterns such as moving a hand upward or downward are executed sequentially. As the basic behavior patterns, the most close to loci of the patterns stored is selected or combined. The basic behavior patterns are large and simple actions at the beginning. However, when parameters such as time elapsed and operating frequency by the user exceed a predetermined value, each behavioral pattern is fractionized, which enables more complicated actions. The pattern selection method includes a method of selecting patterns randomly, a method of selecting patterns close to the feelings and time stored, and a method of selecting patterns when the same user is present in front.

Figures 7, 8:
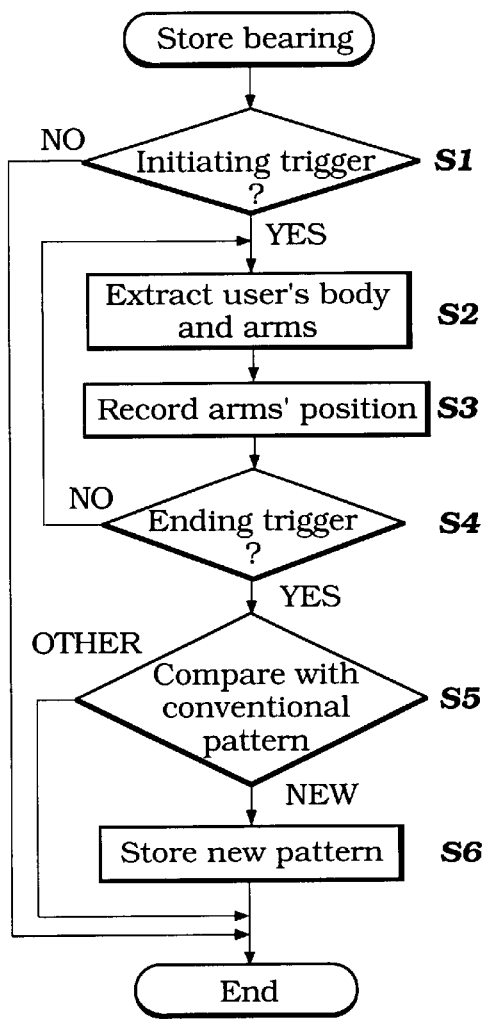
FIG. 7 illustrates an example of FIG. 6.
FIG. 8 is a flowchart showing one embodiment of an autonomous behavior expression system in a robot in accordance with the invention and showing a second embodiment of the process of storing bearing.

FIG. 7 is a figure for illustrating a pattern selection of FIG. 6. With respect to each user, the degree of joy, and time-morning, noon, and night, patterns ①-③ are stored as a map.

FIG. 8 is a flowchart showing a second embodiment of the process of storing bearing. In step S1, a decision is made as to whether or not an initiating trigger is found that executes storing bearing. The initiating trigger includes the following as examples: instructions by the user (a switch, a specific action, etc.), or a situation where robot's "joy" exceeds a predetermined value and/or the user comes to the front of the robot. When no initiating trigger is found, the process is terminated.

Figure 9:
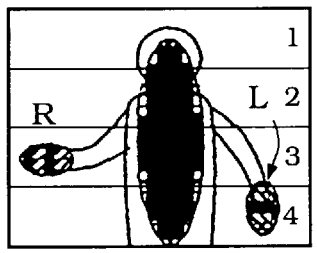
FIG. 9 illustrates the process in FIG. 8.

FIG. 9 is a figure for illustrating the process in FIG. 8. In step S1, when an initiating trigger is found, the step proceeds to Step 2, where, as shown in FIG. 9, an image of the body B and arms R, L of the user 6 is extracted. In step S3, the positions of the right arm R and left arm L are recorded with respect to time. The extracted image is horizontally divided into 1–4. Using the divisions, for example, the positions of the right arm R are recorded as 4, 3, 2, 3, . . . . Without resorting to step S2, the user may directly teach the robot bearing. The process continues until an ending trigger can be found at step S4. The ending trigger exemplifies the following: instructions by the user (a switch, a specific action, etc.), a situation where a certain amount of time has elapsed from a beginning, or a situation where the user is keeping the same posture over a predetermined amount of time. When an ending trigger is found, the process proceeds to step S5, where a comparison is made between a pattern recorded lately and a pattern recorded previously. When a new pattern is found, in step S6, the new pattern is stored.

Figure 10:
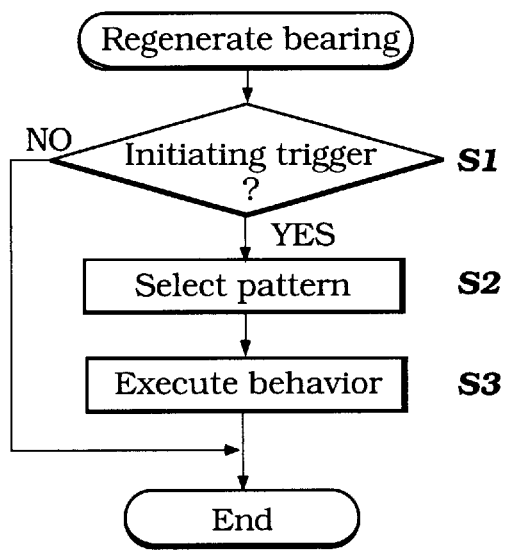
FIG. 10 is a flowchart showing a second embodiment of the process of regenerating bearing stored in FIG. 8.

FIG. 10 is a flowchart showing a second embodiment of the process of regenerating bearing. In step S1, a decision is made whether or not an initiating trigger is found to regenerate bearing. The initiating trigger includes instructions by the user (a switch, a specific action, etc.), a situation where robot's "joy" exceeds a predetermined value and/or the same user is present, and a situation where the time is approaching. When no initiating trigger is found, the process is terminated.

When step S1 finds an initiating trigger, the step proceeds to step S2, where bearing patterns are selected. In step S3, based on the sequences stored, basic behavior patterns such as moving a hand upward or downward are executed sequentially. As the basic behavior patterns, the most close to loci of the patterns stored is selected or combined. The basic behavior patterns are large and simple actions at the beginning. However, when parameters such as time elapsed and operating frequency by the user exceed a predetermined value, each behavioral pattern is fractionized, which enables more complicated actions. The pattern selection method includes a method of selecting patterns randomly, a method of selecting patterns close to the feelings and time stored, and a method of selecting patterns when the same user is present in front.

Figure 11:
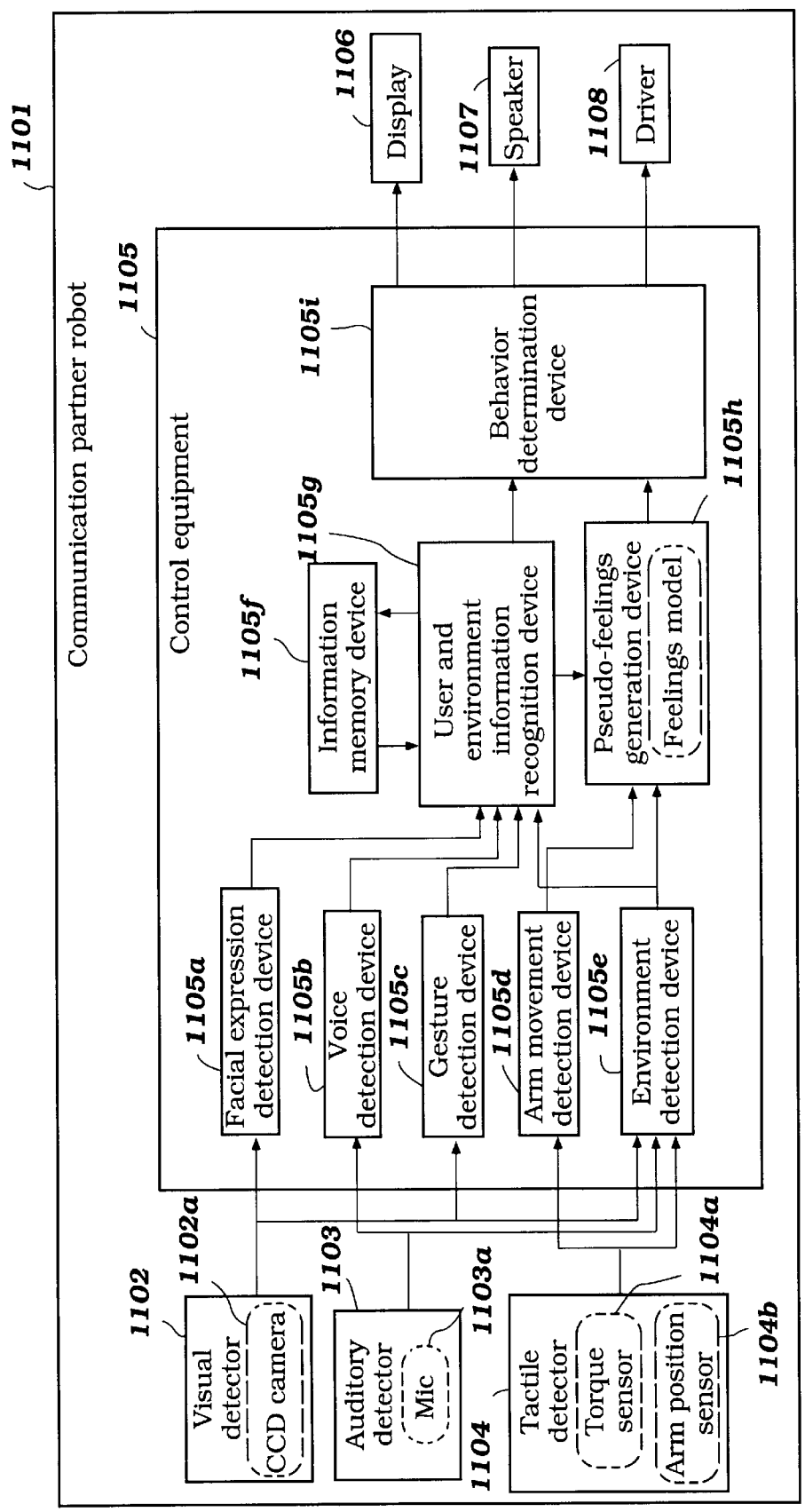
FIG. 11 is an entire block diagram illustrating another embodiment of an autonomous behavior expression system in a robot in accordance with the invention.

FIG. 11 is an entire block diagram illustrating another embodiment of an autonomous behavior expression system in a robot in accordance with the invention. A communication partner robot 1101 comprises a visual detector 1102, an auditory detector 1103, a tactile detector 1104, a control equipment 1105, a display 1106, a speaker 1107, and a driver 1108.

The visual detector 1102 comprises a CCD camera 1102a, the auditory detector 1103 comprises a mic 1103a, and the tactile detector 1104 comprises a torque sensor 1104a and an arm position sensor 1104b.

The control equipment 1105 comprises a facial expression detection device 1105a, a voice detection device 1105b, a gesture detection device 1105c, an arm movement detection device 1105d, an environment detection device 1105e, an information memory device 1105f, a user and environment information recognition device 1105g, a pseudo-feelings generation device 1105h that includes a feelings model, and a behavior determination device 1105i.

The facial expression detection device 1105a receives as an input the output from the visual detector 1102. The voice detection device 1105b receives as an input the output from the auditory detector 1103. The gesture detection device 1105c receives as an input the output from the visual detector 1102. The arm movement detection device 1105d receives as an input the output from the tactile detector 1104. The environment detection device 1105e receives as an input the outputs from the visual detector 1102, the auditory detector 1103, and the tactile detector 1104.

The user and environment information recognition device 1105g receives as inputs the outputs from the facial expression detection device 1105a, the voice detection device 1105b, the gesture detection device 1105c, and the environment detection device 1105e. The user and environment information recognition device 1105g receives information from and sends out information to the information memory device 1005f. The pseudo-feelings generation device 1105h receives information from the user and environment information recognition device 1105g, and receives as inputs the outputs from the arm movement detection device 1105d and the environment detection device 1105e. The behavior determination device 1105i receives as inputs the outputs from the user and environment information recognition device 1105g, and the pseudo-feelings generation device 1105h. The display 1106, the speaker 1107, and the driver 1108 receives as an input the outputs from the behavior determination device 1105i, respectively.

Basic behavioral patterns such as raising a hand upward, downward and forward are beforehand stored in a robot. When a user moves, the most close to the movement is selected from the basic behavioral patterns to make and store behavior sequence. The basic behavioral patterns are, at first, large and simple movements, but as time goes by or when operation frequency by the user exceeds a certain number, each behavioral pattern is divided midway and fractionized to enable complicated movements gradually.

Triggers that initiate storing may be derived by user's instructions or robot's autonomous judgement. For example, storing may be initiated, when robot's feelings of joy are more than a predetermined value compared with the user's, or when the user becomes happy, with all the history of the user's bearings stored, through repetition of the latest movement by the robot.

When exposing his movement to the robot, the user stands opposite to the robot, with his right hand in a red glove and his left hand in a green glove. The robot extracts a red region and a green region within the field of vision from an image input by a camera, recognizes these as right and left hands, respectively, and records their movements with respect to time. In recording the positions, an appropriate coordinate system is set in the image and the coordinate values are recorded. Or, more simply, the extracted image can be vertically divided into four divisions such as 1, 2, 3 and 4, and the positions of the arm may be recorded as 4, 3, 2 and 3.

The camera does not need to be fixed; instead it can be moved so that it may trace the movement of the hand. In this case, as the movement record, both coordinates in the field of vision and camera angles or synthesized coordinate values are used. The gloves are used in the above example as an object for detection. Lamps which turn on and off with different frequencies may also be used. In addition, reflectors to which the robot illuminates a light can be used, and the reflected beam from the reflectors may be detected by a camera.

The gesture detection structure is not limited to a camera. When a supersonic transmitter is mounted on the user's hand, a receiver, which measures a position of sound wave, may be attached to the robot. By measures the position, the movement of the user may be detected. Markers such as transmitters may be mounted to not only hands and arms but also a head and legs, which enables movements of the whole body of the user to be recognized and imitated.

The speech interactive system generally receives user's speech for instructions as an input and produces a voice as an output. However, the speech interactive system of the invention also receives an image as an input and produces as an output an image and/or behavior in addition to a voice. For example, when a user needs a sightseeing guide on a computer (assuming the system is a compute), he is urged to make a speech toward the computer and is guided to a specific place on his mind on the screen of the computer in response to the speech he made. This example represents sound as an input and image as an output. Another example is that an image by a camera may be used as an input to get more information, and voice may be produced as an output to make a user comfortable.

In the speech interactive system of the invention, user's behaviors such as putting his hand at his mouth, folding arms, and tilting his head are stored in a memory. When the user's action is detected and the detected actions corresponds to one of the stored behaviors, the action is regenerated and displayed by, for example, the gestures of a animated creature.

The regeneration is triggered at the time when the system responds, when a predetermined period of time, for example, five seconds, has elapsed during access to the memory if the access has not completed, or when the user cannot obtain predetermined results (for example, when the same procedure is repeated more than three time).

As explained above, one embodiment of the autonomous behavior expression system in accordance with the invention provides robots from which a user can obtain enhanced intimacy and in which the user never loses interest, because the robots can autonomously react to and reproduce user's movements and actions during natural interaction when the user plays with the robots.

One embodiment of the speech interactive system of the invention prevents a situation where the same output is produced for each of different inputs. It also realizes enhanced intimacy to users, because the same attitude as the users' during a conversation makes an amiable atmosphere.

One feature of another embodiment in accordance with the invention is that based on the user and environment information recognition device 4i and the pseudo-feelings generation device 4j, constituted in the characteristic behavior storage device 4m are characteristic behaviors, which in turn is transferred to the behavior determination device 4k to compensate a selection and determination method in behavior selection and determination or behaviors of a robot. This will be described in FIGS. 12–16.

Figure 12:
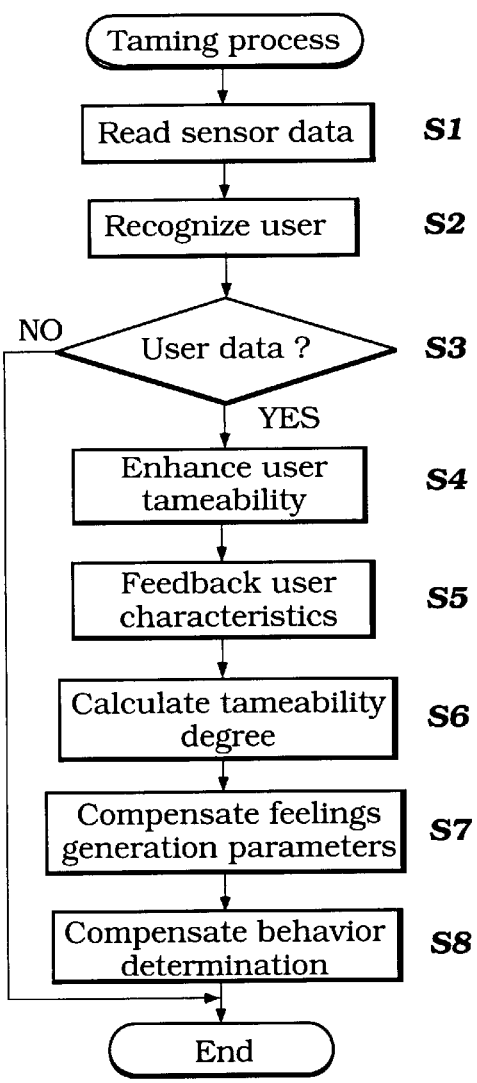
FIG. 12 is a flowchart showing one embodiment of a user recognition growth system in accordance with the invention.

FIG. 12 is a flowchart illustrating one embodiment of a user recognition growth system in accordance with the invention, and illustrating process of taming a robot to a user. The growth of recognition on the part of a robot is explained as a process where the robot becomes "tameable" to the user, which, in a interactive type of apparatus, corresponds to a concept of "becoming familiar" or "becoming mature."

Referring to FIG. 12, in step S1 sensor data from a camera is read, in step S2 a user is recognized based on the sensor data read, and in step S3 it is decided whether the recognized user data has user data. If the user data is not found, the process terminates. If the user data is found, in step S4 the degree of user tameability (user recognition correspondence rate) is enhanced. In step S5, user characteristics are fed back to the memory information process device 4h. This step is performed so that the recognized user data is added to a characteristic extraction template which includes a shape of the face, a color of the skin, a size of the body, and a condition of the hair, of the user, and as a result, detection precision is improved by statistical process.

Figure 13:
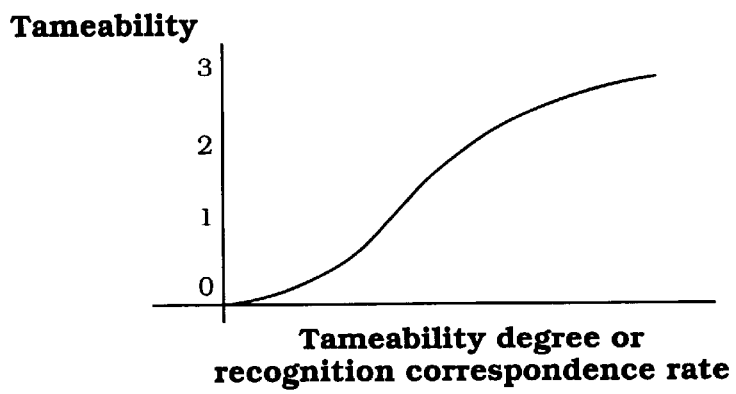
FIG. 13 is illustrates calculation of tameability of FIG. 12.

FIG. 13 is a figure for illustrating calculation of the degree of tameability. In step S6, tameability (degree of recognition) is calculated. The tameability, obtained from the degree of tameability derived from step S4, becomes higher, as the degree of ameability increases. In step S7, based on the tameability obtained, feelings generation parameters are compensated.

FIG. 14 is a figure for illustrating compensation of feelings generation parameters. As shown in the figure, as tameability gets higher, coefficients of joy are increased and coefficients of sorrow are decreased. Based on the parameters compensated, following the aforementioned feelings model, pseudo-feelings are produced. In step S8, behavior determination method or behavior of the robot is compensated.

FIG. 15 is a figure for illustrating compensation of behavior determination. As shown in the figure, when, for example, tameability is 1, an attention object (for example, a barking behavior) is selected preferentially. When tameability is 2, the behavior is selected preferentially that the robot is approaching to the user. In a case where tameability becomes 3, speed of behaviors selected from joy (for example, speed of legs, and length of stride) is magnified.

When the user uses his/her robot for the first time, recognition precision is insufficient because the robot does not have enough information stored, which produces low user correspondence rate and tameability. A long period of use by the same user increases information about him and produces recognition of high precision, which enables higher user correspondence rate and tame behaviors.

FIG. 16 is a figure for illustrating recognition of a user's face. As shown in FIG. 16(A), a face is discriminated from an input image, and interrelationship between a mouth and eyes is extracted. User identification information with a predetermined range of error is obtained and is set as user data. As shown in FIG. 16(B), every time the user is detected, data matched is accumulated and statistical precision is improved to increase correspondence rate regarding the user. The recognition of the user is not restricted to the image data such as his face, but instead can be carried out by voice data or tactile data.

Another embodiment of the invention is explained above. However, the invention is not restricted to the embodiment and various types of modifications and changes can be made. For example, a robot may be operated as electronic robot on a computer display. The invention may be applicable to an interactive type of machinery such as navigation tools, vending machines, and automatic receiving apparatuses.

According to another embodiment of the invention, the robot gradually improves its recognition about the user to by degrees change robot's behaviors accordingly, which produces the robot that attracts the user.

Figure 17:
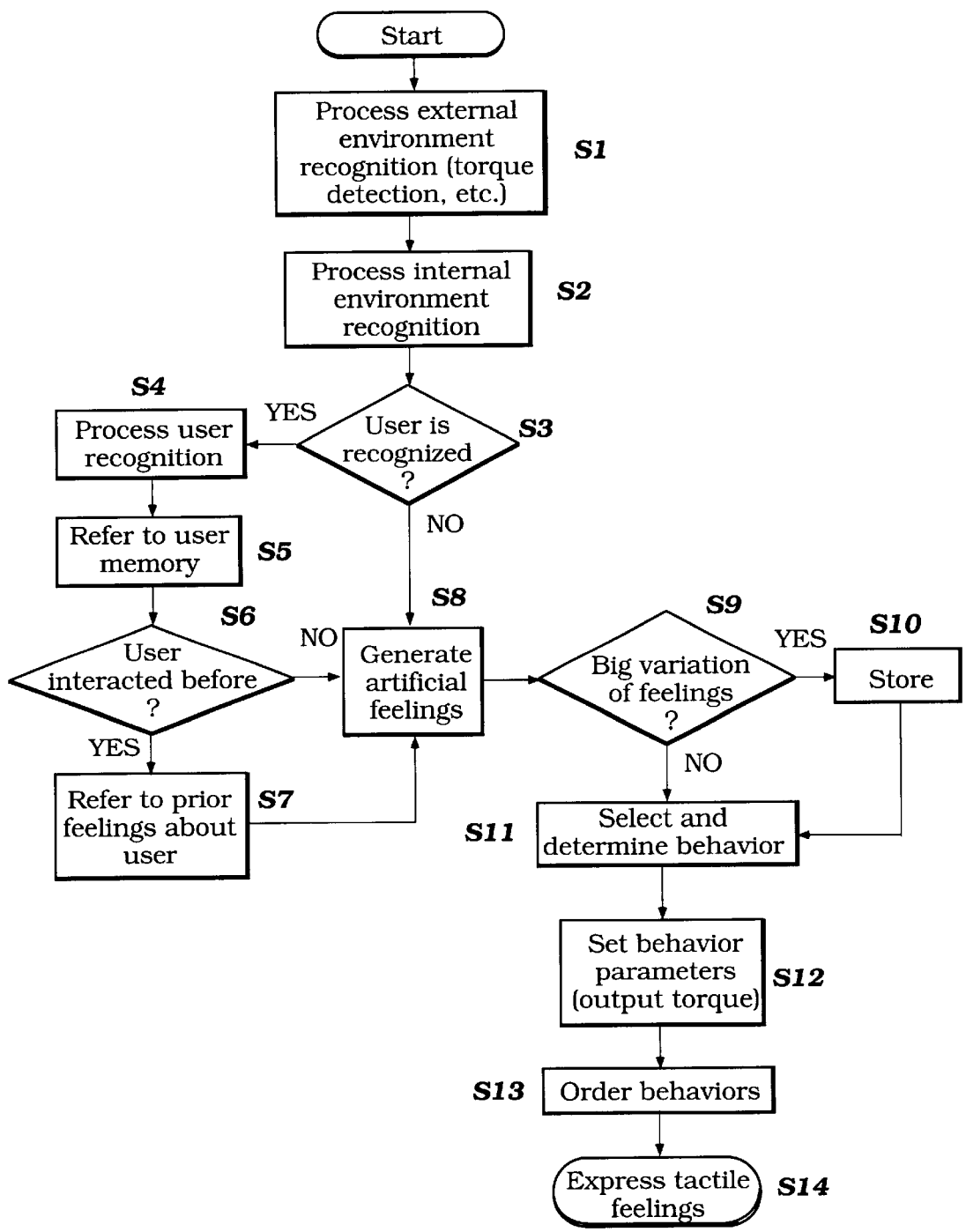
FIG. 17 is flowchart illustrating one embodiment of a tactile expression system in a robot in accordance with the invention.

FIG. 17 is a flowchart illustrating one embodiment of a tactile expression system in a robot of the invention. In step S1, recognition process of external environment information is performed. The process is the one where the pressure sensor 2d, the torque sensor 2e, or the potentiometric sensor 2f detects whether the user has rubbed or patted the robot, detects a torque applied to the hand or leg, or detects a position of joint of the hand or leg. In step S2, recognition process of internal environment information is carried out. According to the process, fatigue of the robot is detected by the battery meter 3a, and load on the motor is detected by the motor thermometer 3b. In step S3, it is judged whether or not the robot recognized the user. If the robot does not, the step proceeds to step S8 where artificial feelings are generated.

If, on the contrary, the robot does, the step proceeds to step S4 where user recognition process is executed. In step S5, user data stored in the memory is referred to. In step S6, it is decided whether or not there is a user who did interaction in the past. If there is not, the step proceeds to step S8 to generate artificial feelings. If there is, in step S7 the memory of the prior feelings (for example, likes or dislikes) about the user is referred to and in step S8 artificial feelings are generated. Here, each degree of user's temper, user's likes or dislikes, robot's fatigue, and robot's anger or joy according to external environment is calculated.

In step S9, variation of feelings is bigger compared with the previous case. If it is, in step S10 the information is stored in the memory. If it is not, in step S11 behaviors of the robot are selected and decided. Then, in step S12 behavior parameters are set. According to the process, for example, when the robot's feelings are anger, the output torque of the motor is made bigger and the resistance is increased to show defiant intention to the user, or the speed of the motor is raised and the speed of shaking a hand is faster to express defiant intention to the user. When, on the contrary, the robot's feelings are joy, the speed or torque of the motor is controlled so that the robot may follow the movement of the user. According to the behavior parameters set, in step S13 behavior instructions are output, and then in step S14 tactile feelings are expressed.

With regard to the machine that can be really touched such as a robot's hand and that has an actuator, the actuator may be operated depending on the internal condition of the robot or the user's feelings such as the force or rhythm the user gave. Accordingly, more active man-machine interaction can be realized where feelings are expressed by resistance when the robot is touched or moved.

According to another embodiment of the invention, tactile interaction between a robot and users can be realized, which provides robots that users do not lose interest in.

Figure 18:
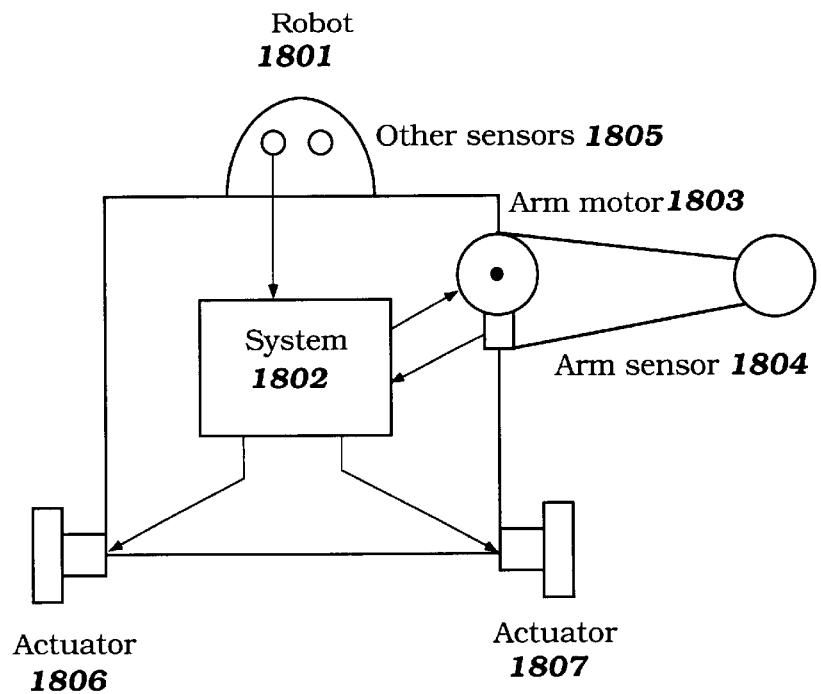
FIG. 18 is a rough presentation of the robot.

FIG. 18 is a rough presentation of the robot. Referring to the figure, a robot 1801 comprises a system 1802 inside, an arm motor 1803, an arm sensor 1804, another sensor 1805, actuators 1806, 1807. The system 1802 is connected to the arm motor 1803 and the arm sensor 1804.

Figure 19:
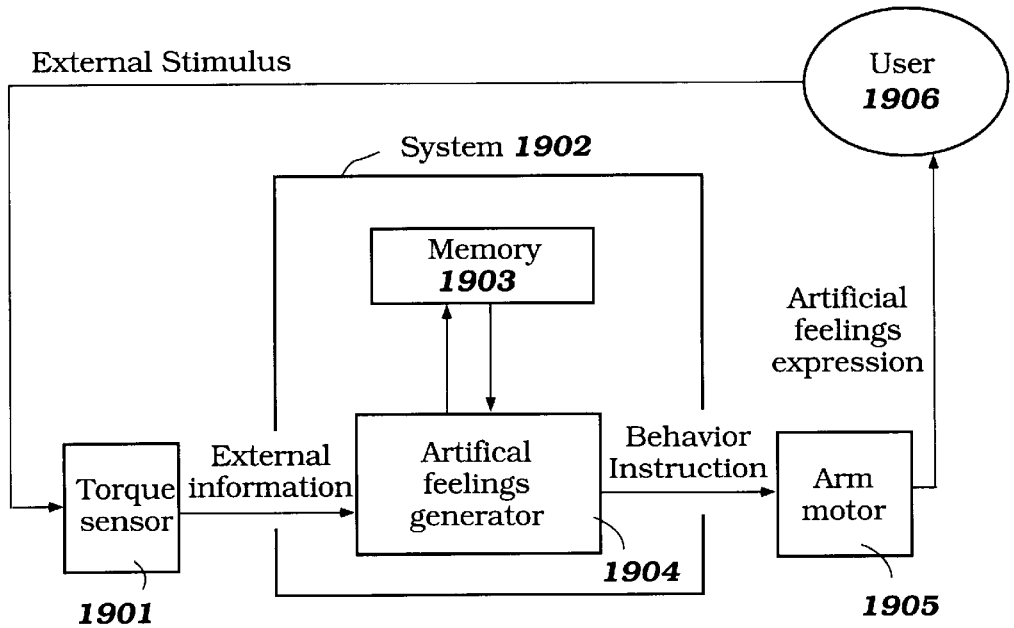
FIG. 19 illustrates interrelationship between the system and the user.

FIG. 19 illustrates interrelationship between the system and the user. Referring to the figure, a torque sensor 1901 receives an external stimulus from a user 1906. The torque sensor 1901 send out external information to a system 1902 which includes a memory 1903 and an artificial feelings generator 1904. Receiving the external information, the artificial feelings generator 1904 outputs behavior instructions to an arm motor 1905, which, in turn, outputs an artificial feelings expression to the user 1906. The memory 1903, connected to the artificial feelings generator 1904, stores information from, and sends out information to, the artificial feelings generator 1904.

Figure 20:
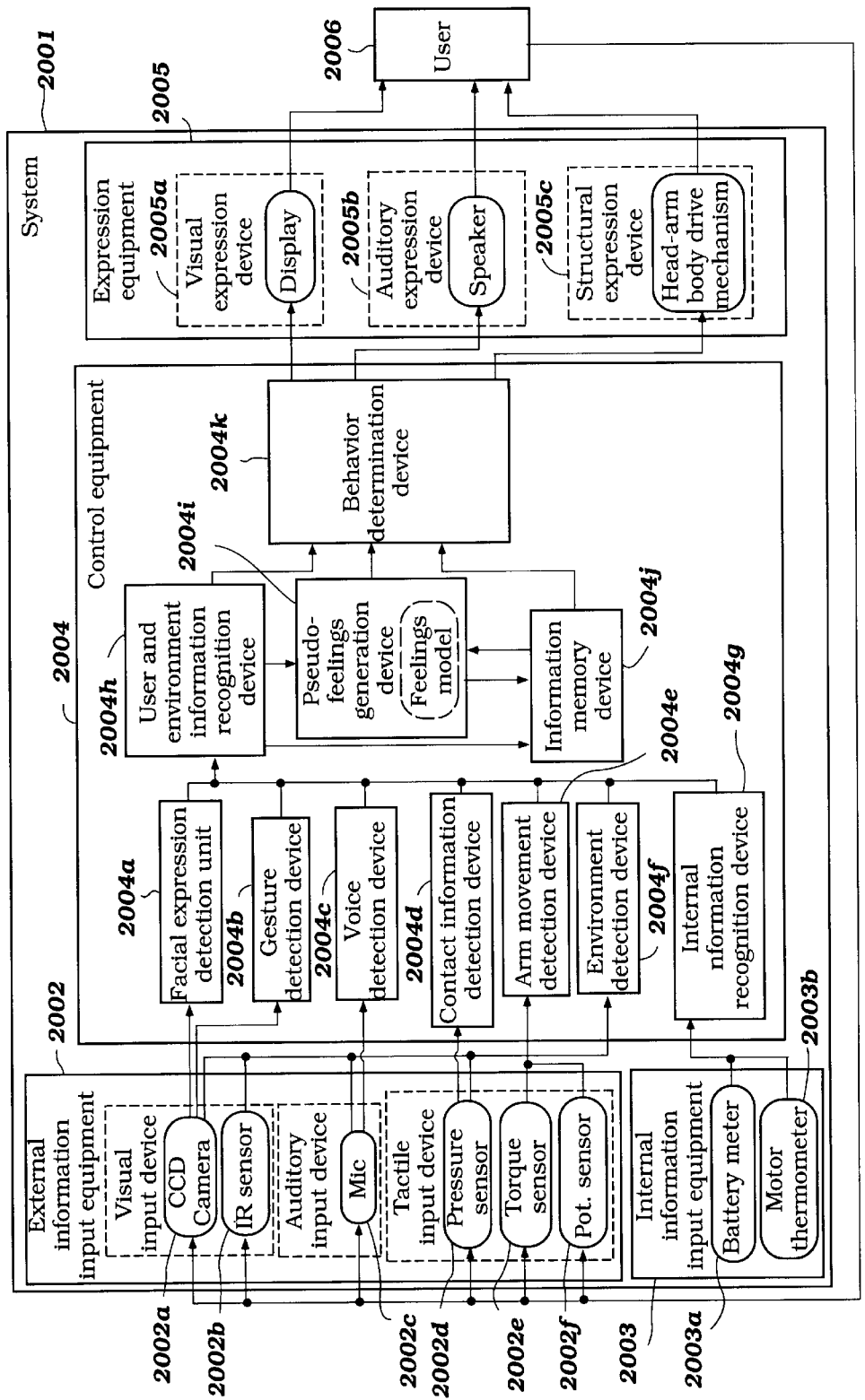
FIG. 20 is an entire block diagram illustrating the embodiments in accordance with the invention.

FIG. 20 is an entire block diagram illustrating the embodiments in accordance with the invention. A system 2001 comprises an external information input equipment 2002, an internal information input equipment 2003, a control equipment 2004, an expression equipment 2005, and a user 2006. The external information input equipment 2002 comprises a visual input device, an auditory input device and a tactile input device. The visual input device comprises a CCD camera 2002*a* and a IR sensor 2002*b*, the auditory input device comprises a mic 2002*c*, and the tactile input device comprises a pressure sensor 2002*d*, a torque sensor 2002*e* and a potentiometetric sensor 2002*f*. The internal information input equipment 2003 comprises a battery meter 2003*a* and a motor thermometer 2003*b*.

The control equipment 2004 comprises a facial expression detection device 2004*a*, a gesture detection device 2004*b*, a voice detection device 2004*c*, a contact information detection device 2004*d*, an arm movement detection device 2004*e*, an environment detection device 2004*f*, an internal information recognition device 2004*g*, a user and environment information recognition device 2004*h*, a pseudo-feelings generation device 2004*i* that includes a feelings model, an information memory device 2004*j*, and a behavior determination device 2004*k*.

The expression equipment comprises a visual expression device that includes a display 2005*a*, an auditory expression device that includes a speaker 2005*b*, and a structural expression device that includes a head-arm-body drive mechanism 2005*c*.

The facial expression detection device 2004*a* receives as an input the output from the CCD camera 2002*a*. The gesture detection device 2004*b* receives as an input the output from the CCD camera 2002*a*. The voice detection device 2004*c* receives as an input the output from the mic 2002*c*. The contact information detection device 2004*d* receives as an input the output from the pressure sensor 2002*d*. The arm movement detection device 2004*e* receives as an input the outputs from the torque sensor 2002*e*, and the potentiometer sensor 2002*f*. The environment detection device 2004*f* receives as an input the outputs from the CCD camera 2002*a*, the IR sensor 2002*b*, the mic 2002*c*, and the pressure sensor 2002*d*. The internal information recognition device 2004*e* receives as an input the outputs from the battery meter 2003*a* and the motor thermometer 2003*b*.

The user and environment information recognition device 2004*h* receives as an input the outputs from the facial expression detection device 2004*a*, the gesture detection device 2004*b*, the voice detection device 2004*c*, the contact information detection device 2004*d*, the arm movement detection device 2004*e*, the environment detection device 2004*f*, and the internal information recognition device 2004*g*. The user and environment information recognition device 2004*h* sends out information to the information memory device 2004*i*. The pseudo-feelings generation device 2004*i* receives information from the user and environment information recognition device 2004*h* and the information memory device 2004*i*, and sends out information to the information memory device 2004*j*.

The behavior determination device 2004*k* receives as inputs the outputs from the user and environment information recognition device 2004*h*, and the pseudo-feelings generation device 2004*i*, and the information memory device 2004*j*. The display 2005*a*, the speaker 2005*b*, and the head-arm-body drive mechanism 2005*c* receives as an input the output from the behavior determination device 2004*k*, respectively. The user 2006 receives as an input the output from the display 2005*a*, the speaker 2005*b*, and the head-arm-body drive mechanism 2005*c*. The user 2006 inputs information to the CCD camera 2002*a*, the IR sensor 2002*b*, the mic 2002*c*, the pressure sensor 2002*d*, the torque sensor 2002*e* and the potentiometetric sensor 2002*f*.

The present invention includes the following embodiments:

(A) A method of enhancing interaction between a user and a machine, said machine comprising (i) a sensor unit for detecting a user, (ii) a data processing unit for extracting features of the user under predetermined rules, (iii) a memory, (iv) a second sensor unit for detecting a user's action, (v) a behavior decision unit including a behavior decision algorithm programmed to select the machine's action when receiving designated signals, and (vi) an actuating unit for actuating the selected action, said method comprising the steps of:
  (a) detecting a user by the sensor unit, extracting features of the user by the data processing unit, and recording the features of the user in the memory;
  (b) interacting with the user, detecting the user's action by the second sensor unit, and saving the user's action in the memory in relation to the features of the user, wherein the machine behaves using the behavior decision unit and the actuating unit;
  (c) determining whether any user having features identical or similar to those of the user is of record in the memory, and if any, updating the features of the user of record by statistical processing, and recording the updated features of the user in the memory in relation to the user's action; and
  (d) modifying the behavior decision algorithm in accordance with the significance of probability of identifying the user based on the statistically processed features of the user, whereby outcome of the machine actuated by the actuating unit changes based on interaction between the user and the machine.

(B) A method of enhancing interaction between a user and a machine, said machine comprising (i) a sensor unit for detecting a user's gestures associated with or without voice, (ii) a behavior library storing behavioral patterns in relation to causative signals, (iii) a memory, (iv) a behavior decision unit including a behavior decision algorithm programmed to select the machine's action from the behavior library when receiving designated signals, and (vi) an actuating unit for actuating the selected action, said method comprising the steps of:
  (a) sensing the user's gestures associated with or without voice by the sensing unit, and recording the sensed gestures in the memory in relation to designated signals causative of the gestures;
  (b) updating the behavior library if the gestures are not of record in the library, and accordingly modifying the behavior decision algorithm;
  (c) when receiving signals indicative of gestures, selecting gestures by the behavior decision unit using the behavior library; and
  (d) actuating the machine to perform the gestures by the actuating unit.

(C) A method of enhancing interaction between a user and a machine, said machine comprising (i) a tactile sensor unit for detecting tactile signals when a user touches the machine, (ii) a second sensor unit for sensing signals causative of the tactile signals, (iii) a memory, (iv) a pseudo-emotion generation unit including an emotion generation algorithm programmed to generate pseudo-emotions when receiving designated signals, (v) a behavior decision unit including a behavior decision algorithm programmed to select the machine's action when receiving designated signals including outcome of the pseudo-emotion generation unit, and (vi) an actuating unit for actuating the selected action, said method comprising the steps of:

(a) sensing the user's tactile input by the sensing unit;
(b) generating pseudo-emotions based on the tactile input and designated signals causative of the tactile input;
(c) selecting an action of the machine by the behavior decision unit based on the tactile input, the generated pseudo-emotions, and the signals causative of the tactile input; and
(d) actuating the machine to perform the selected action by the actuating unit.

In the above, embodiments (A), (B), and (C) can be used individually or in any combination.

With regard to the above described units and algorithms, the following U.S. applications are herein incorporated by reference: U.S. application Ser. No. 09/059,278, filed Apr. 13, 1998, entitled "Control System for Controlling Object Using Pseudo-Emotions Generated in the Object"; U.S. application Ser. No. 09/129,853, filed Aug. 6, 1998, entitled "Control System for Controlling Object Using Pseudo-Emotions Generated in the Object"; U.S. application Ser. No. 09/130,212, filed Aug. 6, 1998, entitled "Control System for Controlling Object Using Pseudo-Emotions and Pseudo-Personality Generated in the Object"; U.S. application Ser. No. 09/393,247, filed Sep. 10, 1999, entitled "Interactive Artificial Intelligence"; U.S. application Ser. No. 09/393,146, filed Sep. 10, 1999, entitled "Interactive Artificial Intelligence"; U.S. application Ser. No. 09/394,369, filed Sep. 10, 1999, entitled "Interactive Artificial Intelligence".

Further, the technologies disclosed in the following publications can be applied to the present invention:

Antonio J. Colmenarez and Thomas S. Huang, "Face Detection and Recognition", NATO Advanced Study Institute on Face Recognition, Stirling, Scotland, UK, 1997, Department of Electrical and Computer Engineering, Coordinated Science Laboratory, and Beckman Institute for Advanced Science and Technology, University of Illinois at Urbana-Champaign.

Juan D. Velasquez, "Modeling Emotion-Based Decision-Making", Proceedings of the 1998 AAAI Fall Symposium Emotional and Intelligent, The Tangled Knot of Cognition (Technical Report FS-98-03), Orlando, Fla.: AAAI Press, MIT Artificial Intelligence Laboratory.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A user recognition growth system, comprising:
   a behavior selection and determination structure for selecting and deciding behaviors based on user information;
   a user information recognition structure for recognizing a user;
   a memory structure for storing the recognized user information;
   a calculating structure for comparing the recognized user information with the stored user information to calculate user recognition; and
   a compensating structure for compensating a selection and determination of the behavior selection and determination structure in accordance with the calculated user recognition.

2. The system of claim 1, further comprising a pseudo-feelings generation structure for producing pseudo-feelings of a robot according to a feelings model for parameters.

3. The system of claim 2, wherein the user recognition is increased every time the user is recognized.

4. The system of claim 1, wherein the parameters are compensated in according with the user recognition.

5. The system of claim 4, wherein the user recognition is increased every time the user is recognized.

6. The system of claim 1, wherein the user information is at least one of user identification, temper, or instruction.

7. The system of claim 1, wherein the user recognition is increased every time the user is recognized..

8. A user recognition growth system, comprising:
   a behavior selection and determination structure for selecting and deciding behaviors based on user information;
   a user information recognition structure for recognizing a user;
   a memory structure for storing the recognized user information;
   a calculating structure for comparing the recognized user information with the stored user information to calculate user recognition; and
   a compensating structure for compensating behaviors selected by the behavior selection and determination structure in accordance with the calculated user recognition.

9. The system of claim 8, further comprising a pseudo-feelings generation structure for producing pseudo-feelings of a robot according to a feelings model for parameters.

10. The system of claim 9, wherein the parameters is compensated in accordance with the user recognition and the behaviors is compensated based on the compensated parameters.

11. The system of claim 10, wherein the user recognition is increased every time the user is recognized.

12. The system of claim 8, wherein the user information is at least one of user identification, temper, or instruction.

13. The system of claim 8, wherein the user recognition is increased every time the user is recognized.

* * * * *